(12) United States Patent
Barnett

(10) Patent No.: US 6,404,574 B1
(45) Date of Patent: Jun. 11, 2002

(54) WRITE DRIVER WITH DIODES TO IMPROVE SWITCHING RATE AND RELIABILITY

(75) Inventor: Raymond E. Barnett, Rosemount, MN (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/379,415

(22) Filed: Aug. 24, 1999

Related U.S. Application Data

(63) Continuation of application No. 08/872,787, filed on Jun. 11, 1997, now Pat. No. 5,986,832.
(60) Provisional application No. 60/022,477, filed on Jun. 13, 1996.

(51) Int. Cl.[7] .................................................. G11B 5/09
(52) U.S. Cl. ........................... 360/46; 360/68; 327/110; 327/312; 327/314
(58) Field of Search ............................... 360/46, 67, 68, 360/66, 61; 327/494, 108, 110, 111, 112, 309, 310, 312, 314, 320, 321, 317

(56) References Cited

U.S. PATENT DOCUMENTS

| 5,469,095 A | 11/1995 | Peppiette et al. ........... 327/110 |
| 5,539,342 A | 7/1996 | Gersbach et al. ........... 327/110 |
| 5,612,828 A | 3/1997 | Brannon et al. ............... 360/46 |
| 5,638,012 A | 6/1997 | Hashimoto et al. ......... 327/110 |
| 5,739,706 A | 4/1998 | Okamoto ..................... 327/110 |
| 5,852,526 A | 12/1998 | Huntington ................... 360/66 |
| 5,877,911 A | 3/1999 | Klaassen et al. .............. 360/67 |
| 5,986,832 A | * 11/1999 | Barnett ......................... 360/46 |

* cited by examiner

Primary Examiner—Alan T. Faber
(74) Attorney, Agent, or Firm—Kinney & Lange, P.A.

(57) ABSTRACT

A write driver, having a pair of head nodes for connection to a write head, includes two diodes connected, respectively to the head nodes and the emitters of first and second upper drive transistors. The diodes increase the voltage necessary to breakdown the emitter pn junctions of the upper drive transistors, thereby enabling a greater head swing voltage, higher switching rates, and ultimately closer spacing of data on a magnetic medium.

14 Claims, 1 Drawing Sheet

WRITE DRIVER WITH DIODES TO IMPROVE SWITCHING RATE AND RELIABILITY

CROSS-REFERENCE TO RELATED APPLICATIONS

This application is a continuation of application Ser. No. 08/872,787 filed Jun. 11, 1997, now U.S. Pat. No. 5,986,832, which in turn claims benefit of application Ser. No. 60/022,477 filed Jun. 13, 1996.

BACKGROUND OF THE INVENTION

The present invention pertains to write drivers which operate the write heads in mass data storage systems, particularly magnetic data storage systems.

In magnetic data storage systems, a magnetic write head writes or stores data as a sequence of ones and zeros on a magnetic medium, such as a magnetic tape or disc. The write head uses an inductive coil to generate magnetic fields, which form magnetic patterns representing the ones and zeros on the medium. Writing a "one" entails directing electric current through the inductive coil in one direction, and writing a "zero" entails directing current in the opposite, or reverse, direction. Thus, writing specific data requires selectively changing the direction of current through the coil of the write head.

Changing the direction of current through the coil is the function of a write driver. A typical write driver includes an H-switch drive circuit and a control circuit. The H-switch drive circuit, which resembles an "H," has two head pins connected to a write head to form the cross-bar of the H, and four drive transistors: two drive transistors form the upper legs and two form the lower legs of the H. The upper legs connect to a high voltage, and the lower legs connect to a low voltage. The control circuit, which responds to data signals, selectively operates the four drive transistors as on-off switches, thereby controlling current direction through the write head. Specifically, to direct current left to right through the write head, the control circuit turns on the left-upper and the right-lower drive transistors and turns off the right-upper and the left-lower drive transistors. Conversely, the control circuit turns off the left-upper and right-lower drive transistors and turns on the right-upper and the left-lower drive transistors to direct current right to left through the write head.

Typically, one principal concern in the design of write drivers is speed, or switching rate. Switching rate, a measure of how fast the write driver reverses current direction, defines the spatial transitions between the ones and zeroes written on a magnetic medium, with higher switching rates providing sharper, more distinctive transitions than lower switching rates. Ultimately, a higher switching rate yields closer data spacing and thus greater data capacity for a magnetic medium. A key determinant of switching rate is head swing voltage, the voltage difference between the head pins of the write driver. Since switching rate is proportional to head swing voltage, a large head swing voltage is desirable. In theory, the maximum head swing voltage, for any write driver, is the difference between the high and low voltages connected to the write driver. However, in typical write drivers, the upper drive transistors (the ones forming the upper legs of the H) impose a lesser practical limit on head swing voltage.

The practical limit stems from two facts: one, the base-emitter pn junctions of these transistors have a low (five-volt) breakdown voltage; and two, most of the head swing voltage appears across these junctions during operation of the write driver. Exceeding the breakdown voltage breaks down these pn junctions, and over time degrades current gain of the upper drive transistors, thereby reducing current to the write head and ultimately the magnetic strength of data it writes to a magnetic medium. Thus, to avoid breaking down the pn junctions of the upper drive transistors, it is necessary to sacrifice switching rate by limiting head swing voltage.

However, even with an appropriately-limited head swing voltage, the junctions of the upper drive transistors are still subject to breakdown. In particular, during reversals of write current direction, the write head exhibits self-inductance, a phenomenon which produces a voltage spike at one of the head pins. The voltage spike shoots several volts above the high voltage and thus may exceed the breakdown voltages of the pn junctions.

Moreover, because of inherent capacitance and inductance in both the drive transistors and the write head, the voltage spike incites a ringing, or oscillating, voltage that last several nanoseconds. Although the ringing voltage eventually decays to a negligible level, its amplitude, based on the originating voltage spike, temporarily exceeds the breakdown voltage of the pn junction, thereby causing the undesirable breakdown of the pn junctions in the upper drive transistors.

Accordingly, there is a need for a write driver that not only prevents breakdown in the upper drive transistors but also allows greater head swing voltage.

SUMMARY OF THE INVENTION

The present invention, a write driver having two head pins for connection to a write head, includes a pair of diodes connected between two upper drive transistors and the head pins. The diodes increase the voltage necessary to breakdown pn junctions in the upper drive transistors, thereby allowing greater headswing voltage, higher switching rates, and ultimately closer data spacing on a magnetic medium. Moreover, the diodes include inherent capacitances which reduce effective capacitance of the write driver and shorten the duration of any ringing resulting from write head self-inductance.

DETAILED DESCRIPTION OF THE PREFERRED EMBODIMENTS

Figure 1:
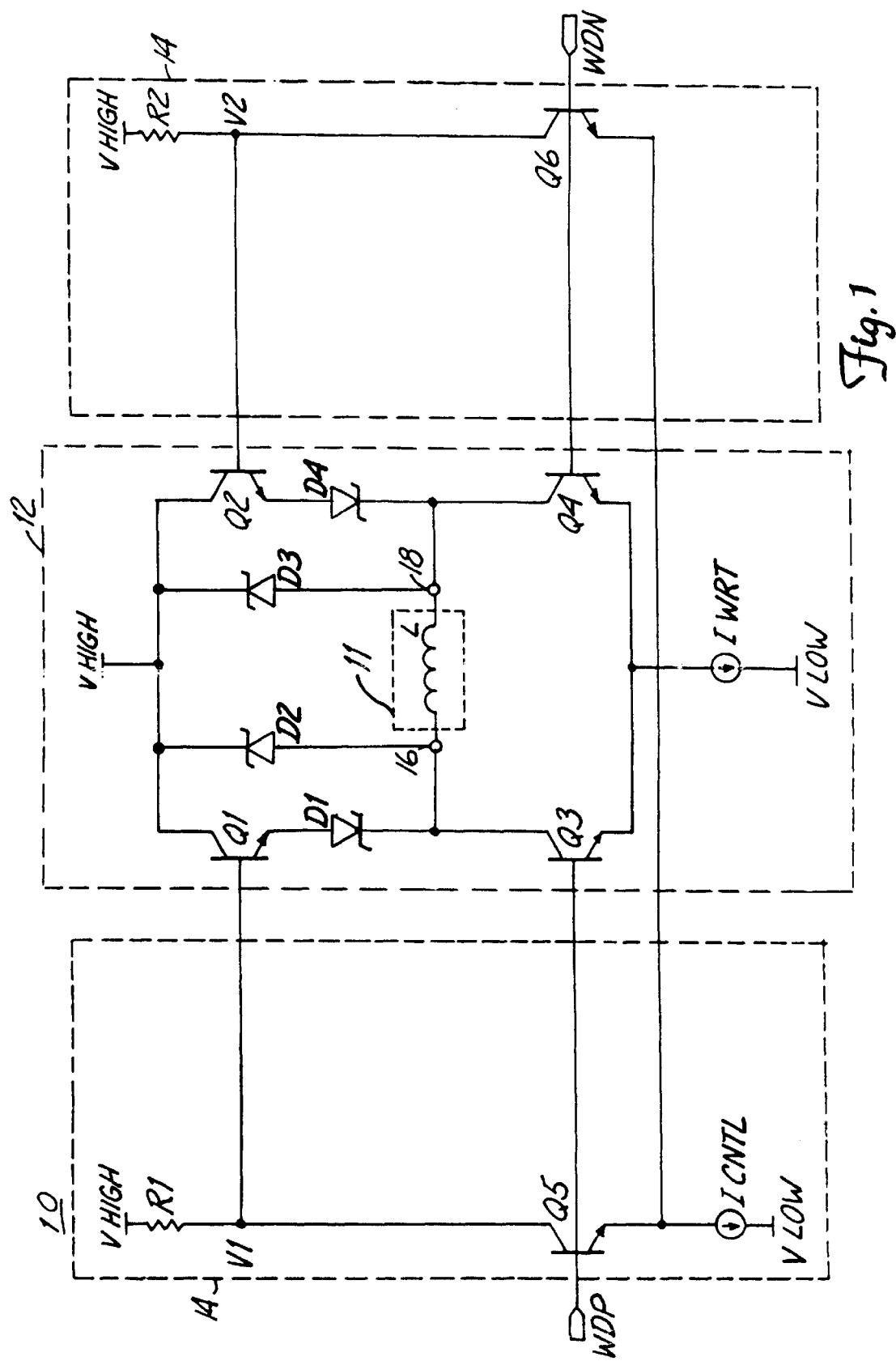
FIG. 1 shows a write driver incorporating the teachings of the present invention.

FIG. 1 shows a write driver 10 for a write head 11. Write head 11 includes an inductive coil L with a typical inductance of two micro-henrys. Write driver 10 includes an H-switch drive circuit 12 and a differential control circuit 14.

H-switch drive circuit 12, connected between high and low voltage supply pins Vhigh and Vlow, includes matched drive transistors Q1–Q4, head pins 16 and 18, diodes D1–D4, and write current generator Iwrt. High supply pin Vhigh has a preferred voltage Vhigh of 12 volts, and low supply pin Vlow has a preferred voltage Vlow of zero volts. Drive transistors Q1–Q4 are preferably npn-type bipolar junction transistors, each with three nodes, or regions: a control region, called a base, and two controlled regions, called a collector and an emitter. Transistors Q1–Q4 are preferably capable of conducting 20 milliamperes of current, the preferred current generated by write current generator Iwrt. Diodes D1–D4 are preferably fast-acting Schottky diodes (majority carrier devices), each with a preferred nominal breakdown voltage of 20 volts. It is feasible, however, to use other types of diodes with lesser or greater breakdown voltages.

Drive transistors Q1 and Q2, the upper drive transistors, have their respective emitter and collector connected between head pins 16 and 18 and positive voltage supply pin Vhigh. The collector and emitter of drive transistors Q3 and Q4, the lower drive transistors, are connected respectively between head pins 16 and 18 and a positive node of write current generator Iwrt. The negative node of current generator Iwrt is connected to low voltage supply pin Vlow. Diodes D1 and D2 are connected respectively between the Q1 and Q2 emitters and head pins 16 and 18. And, diodes D3 and D4 are connected respectively between head pins (or nodes) 16 and 18 and positive supply pin Vhigh. The bases, or control regions, of drive transistors Q1–Q4 are connected to differential control circuit 14.

Differential control circuit 14 comprises inputs WDP and WDN, control transistors Q5 and Q6, pull-up resistors R1 and R2, and control current generator Icntl. Inputs WDP and WDN are connected respectively to the bases of matched npn control transistors Q5 and Q6 and to the bases of lower H-switch drive transistors Q3 and Q4. Transistors Q5 and Q6, which form an emitter-coupled differential pair, have their emitters connected together and their collectors connected respectively to positive supply pin Vhigh via matched 800-Ohm pull-up resistors R1 and R2. The junctions between resistors R1 and R2 and the collectors of transistors Q3 and Q4 form respective control voltage nodes V1 and V2. Control current generator Icntl, which preferably provides a constant control current Icntl of about 10 milliamperes, is connected between low supply pin Vlow and the junction of the Q5 and Q6 emitters (that is, the emitters of transistors Q5 and Q6).

In operation, control circuit 14, responsive to complementary signals at inputs WDP and WDN, directs control current Icntl through either resistor RI or resistor R2. When input WDP has a higher voltage than input WDN (by at least 100 millivolts) control circuit 14 activates control transistor Q5 and deactivates control transistor Q6, directing control current Icntl through resistor R1 and away from resistor R2. This condition sets the voltage at control voltage node V1 to Vhigh−IcntlR1, supply voltage Vhigh minus the voltage across resistor R1 due to control current Icntl. It also sets the voltage at control voltage node V2 to voltage Vhigh, since virtually no control current flows through resistor R2. This activates, or turns on, drive transistors Q2 and Q3 and turns off drive transistors Q1 and Q4, thereby driving write current Iwrt from high supply pin Vhigh, through diode D2, through write head 11 from pin 18 to pin 16, and into low supply pin Vlow.

Conversely, when input WDN has a higher voltage than input WDP, control circuit 14 activates control transistor Q6 and deactivates control transistor Q5, directing control current Icntl through resistor R2 instead of resistor R1. Control current flowing through resistor R2 lowers the voltage at node V2 from voltage Vhigh to Vhigh−IcntlR2, the high supply voltage minus the voltage across resistor R2 due to control current Icntl. On the other hand, directing current away from resistor R1 raises the voltage at node V1 (from Vhigh−IcntlR1) to voltage Vhigh. Setting the voltage of nodes V1 and V2 respectively high and low activates transistor Q1 and deactivates transistor Q2, forcing write current Iwrt to flow from supply pin Vhigh, through transistor Q1 through diode D1, through write head 11 from pin 16 to 18, and into supply pin Vlow. Thus, the relative voltage of the signals at inputs WDP and WDN controls the direction write current Iwrt flows through the write head, enabling the writing of a specific bit pattern on a magnetic medium.

Unlike typical prior art write drivers, write driver 10 includes diodes D1 and D4 which increase the voltage necessary to break down the base-emitter pn junctions of upper drive transistors Q1 and Q2. Specifically, the series connection of diode D1 and the base-emitter pn junction of transistor Q1 has a cumulative breakdown voltage of 25 volts, the sum of the nominal breakdown voltage of the pn junction (five volts) and the preferred nominal breakdown voltage of diode D1 (20 volts). Likewise, the series connection of diode D4 and the base-emitter pn junction of transistor Q2 has a cumulative breakdown voltage of 25 volts. Thus, the write driver of the present invention extends the practical limit on headswing voltage beyond the typically-low breakdown voltage of the upper drive transistors, thereby permitting higher switching rates, and ultimately closer data spacing on a magnetic medium.

Moreover, diodes D1 and D4 include inherent capacitances which add as series capacitances to the inherent capacitances of the pn junctions of upper drive transistors Q1 and Q2. Since two capacitances added in series yield an effective capacitance that is less than either of the two separate capacitances, the placement of diodes D1 and D2 reduce effective capacitance of the write driver and shorten the duration of any ringing resulting from write head self-inductance.

Additionally, write driver 10 includes diodes D2 and D3, connected respectively between head pins 16 and 18 and high supply pin Vhigh. Diodes D2 and D3 serve as voltage clamps to limit the magnitude of voltage spikes and ringing stemming from self-inductance of the write head during reversals of write current direction. The voltage spikes, which typically exceed the high supply voltage by several volts, can break down the pn junctions of the upper drive transistors. Thus, diodes D2 and D3 provide further protection against breakdown of the pn junctions of upper drive transistors Q1 and Q2.

Although the present invention has been described with reference to preferred embodiments, workers skilled in the art will recognize that changes may be made in form and detail without departing from the spirit and scope of the invention.

What is claimed is:

1. A writer driver including:

first and second head nodes for coupling to a write head;

first and second supply nodes;

first and second drive transistors each having a collector and an emitter, with the collectors of the first and second drive transistors coupled to the first supply node, the emitter of the first drive transistor coupled to the first head node and the emitter of the second drive transistor coupled to the second head node;

a first diode coupled between the emitter of the first drive transistor and the first head node;

a second diode coupled between the emitter of the second drive transistor and the second head node; and a control circuit having first and second data inputs for receiving input signals representative of data to be written by the write head, the first and second data inputs being coupled respectively to the first and second drive transistors, the first drive transistor being responsive to input signals at one of the first and second data inputs to supply write current through a write head coupled to first and second head nodes in a first direction and the second drive transistor being responsive to input signals at another of the first and second data inputs to supply write current through the write head coupled to first and second head nodes in a second direction opposite the first direction.

2. The write driver of claim 1 wherein a sum of breakdown voltage of a pn junction of the first drive transistor and a breakdown voltage of the first diode is greater than the breakdown voltage of the pn junction of the first drive transistor alone.

3. The write driver of claim 2 wherein a sum of a breakdown voltage of a pn junction of the second drive transistor and a breakdown voltage of the second diode is greater than the breakdown voltage of the pn junction of the second drive transistor alone.

4. The write driver of claim 1 wherein the first and second diodes each includes an inherent capacitance that combines with capacitance of the respective first and second drive transistors to reduce capacitance of the write driver and thereby reduce ringing in the write driver.

5. A write driver comprising:
   an H-switch drive circuit for providing write current to a write head having first and second upper drive transistors through which the write current selectively flows to the write head, first and second lower drive transistors through which the write current selectively flows from the write head, first and second head nodes for connection to the write head, a first diode connected between the first upper drive transistor and the first head node, and a second diode connected between the second upper drive transistor and the second head node; and
   a control circuit responsive to data signals to selectively operate the drive transistors of the H-switch drive circuit to control direction of write current flow between the pair of head nodes.

6. A write driver comprising:
   an H-switch drive circuit for providing write current to a write head having first and second upper drive transistors through which write current selectively flows to the write head, first and second lower drive transistors through which write current selectively flows from the write head, first and second head nodes for connection to the write head, and means connected to the upper first and second drive transistors and the first and second head nodes, respectively, for increasing headswing voltage; and
   a control circuit responsive to data signals to selectively operate the drive transistors of the H-switch drive circuit to control direction of write current flow between the pair of head nodes.

7. The write driver of claim 6, wherein the means for increasing headswing voltage comprises:
   a first semiconductor device connected between the first upper drive transistor and the first head node; and
   a second semiconductor device connected between the second upper drive transistor and the second head node.

8. The write driver of claim 7, wherein the first and second semiconductor devices are diodes.

9. An H-switch drive circuit for providing write current to a write head comprising:
   first and second upper drive transistors through which write current selectively flows to the write head;
   first and second lower drive transistors through which write current selectively flows from the write head;
   first and second head nodes for connection to the write head; and
   first and second means connected between the first and second upper drive transistors and the first and second head nodes, respectively, for increasing switching rates at which write current direction through the write head is reversed.

10. The H drive circuit of claim 9 wherein the first and second means for increasing switching rates comprise first and second semiconductor devices, respectively.

11. The H drive circuit of claim 10 wherein the first and second semiconductor devices are diodes.

12. An H-switch drive circuit for providing write current to a write head comprising:
   first and second upper drive transistors through which write current selectively flows to the write head;
   first and second lower drive transistors through which write current selectively flows from the write head;
   first and second head nodes for connection to the write head; and
   first and second means connected between the first and second upper drive transistors and the first and second head nodes, respectively, for decreasing effective capacitance of the H-switch drive circuit to shorten duration of ringing resulting from write head self inductance.

13. An H-switch drive circuit for providing write current to a write head comprising:
   first and second upper drive transistors through which write current selectively flows to the write head;
   first and second lower drive transistors through which write current selectively flows from the write head;
   first and second head nodes for connection to the write head;
   first means connected between the first upper drive transistor and the first head node for decreasing effective capacitance and increasing effective breakdown voltage of the first upper drive transistor; and
   second means connected between the second upper drive transistor and the second node for decreasing effective capacitance and increasing effective breakdown voltage of the second upper drive transistor.

14. An H-switch drive circuit for providing write current to a write head comprising:
   first and second upper drive transistors through which write current selectively flows to the write head;
   first and second lower drive transistors through which write current selectively flows from the write head;
   first and second head nodes for connection to the write head; and
   first and second means connected between the first and second upper drive transistor and the first and second head nodes, respectively, for increasing switching rates at which write current direction through the write head is reversed and decreasing effective capacitance of the first and second upper drive transistors.

* * * * *